United States Patent
Lin et al.

(10) Patent No.: US 11,371,885 B2
(45) Date of Patent: Jun. 28, 2022

(54) OPTICAL SENSOR CIRCUIT

(71) Applicants: Au Optronics Corporation, Hsinchu (TW); National Cheng-Kung University, Tainan (TW)

(72) Inventors: Chih-Lung Lin, Tainan (TW); Chia-En Wu, Chiayi (TW); Chia-Lun Lee, New Taipei (TW); Jui-Hung Chang, Taichung (TW); Jian-Shen Yu, Hsinchu (TW)

(73) Assignees: Au Optronics Corporation, Hsinchu (TW); National Cheng-Kung University, Tainan (TW)

( * ) Notice: Subject to any disclaimer, the term of this patent is extended or adjusted under 35 U.S.C. 154(b) by 91 days.

(21) Appl. No.: 16/594,085

(22) Filed: Oct. 7, 2019

(65) Prior Publication Data
US 2020/0158574 A1 May 21, 2020

(30) Foreign Application Priority Data

Nov. 16, 2018 (TW) .................................. 107140855
Jul. 3, 2019 (TW) .................................. 108123500

(51) Int. Cl.
*G01J 3/51* (2006.01)
*G01J 3/50* (2006.01)

(52) U.S. Cl.
CPC ................. *G01J 3/51* (2013.01); *G01J 3/505* (2013.01)

(58) Field of Classification Search
CPC ................. G01J 1/46; G01J 3/505; G01J 3/51

USPC ......................................................... 356/419
See application file for complete search history.

(56) References Cited

U.S. PATENT DOCUMENTS

| 9,631,975 B2 | 4/2017 | Yu et al. | |
| 10,175,098 B2 | 1/2019 | Lin et al. | |
| 2007/0242030 A1* | 10/2007 | Kim | ..................... G09G 3/3406 |
| | | | 345/102 |
| 2009/0002341 A1 | 1/2009 | Saito et al. | |
| 2017/0276541 A1* | 9/2017 | Lin | ........................ G06F 3/042 |

FOREIGN PATENT DOCUMENTS

| CN | 101989140 | 3/2011 |
| CN | 105890749 | 8/2016 |
| TW | I425494 | 2/2014 |

* cited by examiner

*Primary Examiner* — Sunghee Y Gray
(74) *Attorney, Agent, or Firm* — JCIPRNET

(57) ABSTRACT

An optical sensor circuit is provided. In the optical sensor circuit, an output stage circuit transmits a voltage of first and second node to the output line according to a first driving signal. A first sensor is configured to generate a first photocurrent according to a first color light that senses an ambient light, and generate a second photocurrent according to a second color light. A second sensor is configured to generate a third photocurrent according to a third color light, and generate a fourth photocurrent according to the second color light. In a sensing phase, when the first sensor senses the first color light, and the second sensor senses the third color light, the first sensor adjusts a voltage level of the voltage according to the first photocurrent, and the second sensor adjusts the voltage level of the voltage according to the third photocurrent.

5 Claims, 7 Drawing Sheets

OPTICAL SENSOR CIRCUIT

CROSS REFERENCE TO RELATED APPLICATION

This application claims the priority benefits of Taiwan application serial no. 107140855, filed on Nov. 16, 2018, and Taiwan application serial no. 108123500, filed on Jul. 3, 2019. The entirety of each of the above-mentioned patent applications is hereby incorporated by reference herein and made a part of specification.

BACKGROUND

Field of the Disclosure

The disclosure relates to a sensor circuit, and more particularly to an optical sensor circuit.

Description of Related Art

With the advancement of technology, in order to be more convenient for carrying, lighter in weight, and more user-friendly, the input device such as conventional keyboard or mouse of many electronic devices has been converted into input panel. The input panel can be roughly categorized into an optical sensing input mode and a touch input mode. It should be noted that since the touch input mode needs to perform sensing through frequent touches by the user, the input panel is more likely to be damaged. Therefore, the input panel of the optical sensing input mode has a longer service life than the input panel of the touch input mode.

In the related art, an optical sensor circuit typically utilizes a transistor in each sensor to sense a specific light source to correspondingly generate a photocurrent. Meanwhile, the optical sensor circuit can determine whether the optical sensor circuit detects a specific light source according to the photocurrent. However, since the spectrum of the white color light of the ambient light includes the bands of all the color lights (for example, the red color light, the green color light, and the blue color light), when the optical sensor circuit is performing sensing of light source, it is more likely to be influenced by the white color light, which makes it more likely for each sensor to make erroneous judgment. Under this circumstances, it is an important issue for practitioners of the field to find out how to make the optical sensor circuit to effectively inhibit the influence of white color light of ambient light when operating in the sensing phase under charging mode and discharging mode, thereby improving the performance of the optical sensor circuit.

SUMMARY OF THE DISCLOSURE

The disclosure provides an optical sensor circuit, which can effectively suppress the influence of white color light of ambient light on the sensor to ensure that the optical sensor circuit can operate normally.

The optical sensor circuit of the disclosure includes an output stage circuit, a first sensor, and a second sensor. The output stage circuit has a first node and a second node, the output stage circuit transmits a first voltage of the first node and a second voltage of the second node to the output line according to the first driving signal. The first sensor is coupled to the first node, the first sensor is configured to generate the first photocurrent according to the first color light that senses the ambient light, and generate the second photocurrent according to the second color light that senses the ambient light. The second sensor is coupled to the second node, and the second sensor is configured to generate a third photocurrent according to the third color light that senses the ambient light, and generate the fourth photocurrent according to the second color light that senses the ambient light. In the sensing phase, when the first sensor senses the first color light, and the second sensor senses the third color light, the first sensor adjusts the voltage level of the first voltage according to the first photocurrent, and the second sensor adjusts the voltage level of the second voltage according to the third photocurrent.

The optical sensor circuit of the disclosure includes a first sensor, a second sensor, and an output stage circuit. The first sensor is coupled to the first node, and the first sensor is configured to generate the first photocurrent according to the first color light and the second color light that sense the ambient light. The second sensor is coupled between the first node and the first system voltage or between the first node and the second system voltage, and the second sensor is configured to generate the second photocurrent according to the third color light that senses the ambient light. The output stage circuit is coupled between the first node and the reference voltage, and the output stage circuit transmits the first voltage of the first node to the output line according to the first driving signal. In the sensing phase, when the first sensor senses the first color light and the second color light, the first sensor adjusts the voltage level of the first voltage according to the first photocurrent.

Based on the above, the optical sensor circuit of the disclosure can adjust the voltage level of the capacitor in the output stage circuit according to the driving signal and the pull-up or pull-down current in the sensor under the condition of operating under the charging mode and the discharging mode while the sensor senses the additional red color light and the blue color light. In this manner, under the charging mode, the voltage level of the voltage of the capacitor can be maintained at a state of high voltage level without being influenced by the white color light of the ambient light and pulled down to a low voltage level. Moreover, under the discharging mode, the voltage level of the voltage of the capacitor can be maintained at a state of low voltage level without being influenced by the white color light of the ambient light and pulled up to a high voltage level, thereby ensuring that the optical sensor circuit can be operated normally during the sensing phase under the charging mode and the discharging mode.

In order to make the aforementioned features and advantages of the disclosure more comprehensible, embodiments accompanying figures are described in detail below.

DESCRIPTION OF EMBODIMENTS

Figure 1A:
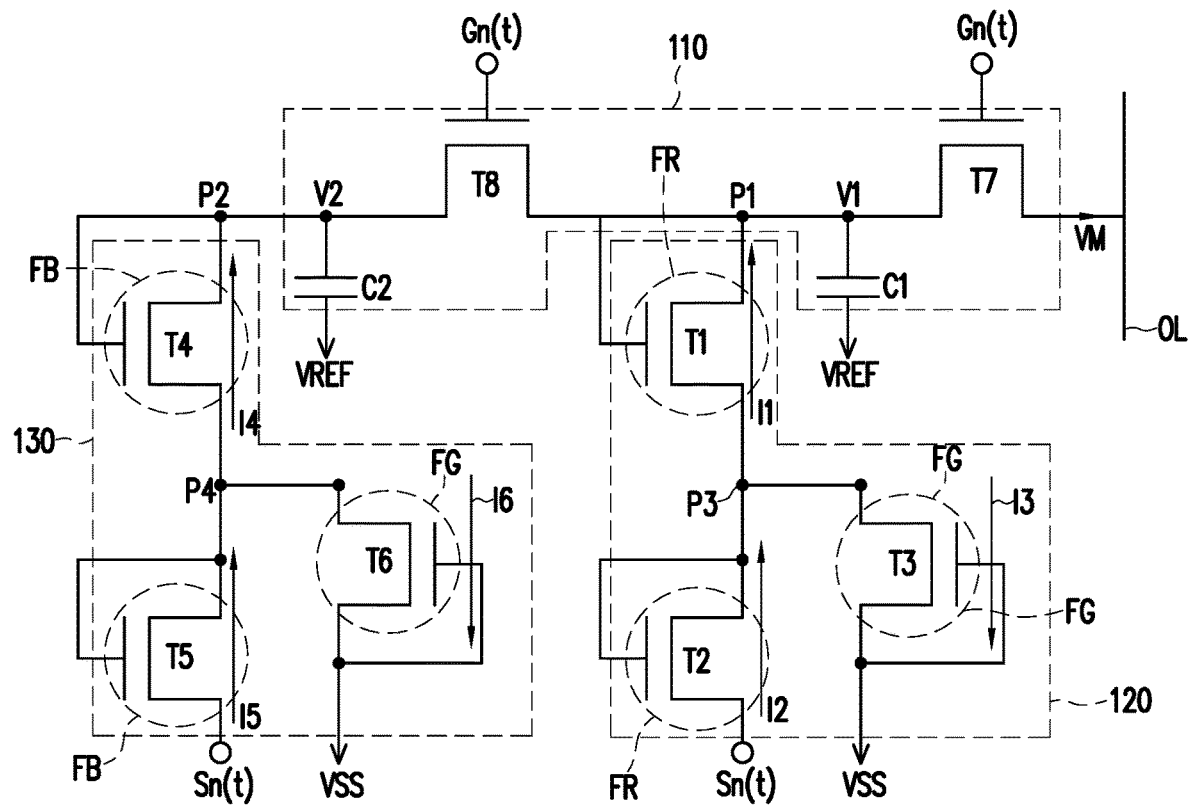
FIG. 1A is a circuit diagram of an optical sensor circuit operating under a charging mode according to an embodiment of the disclosure.

The term "coupled to (or connected to)" as used throughout the specification (including the scope of the claims) may refer to any direct or indirect connection means. For example, if it is described that the first device is coupled (or connected) to the second device, it should be construed that the first device can be directly connected to the second device, or the first device can be indirectly connected to the second device through other device or a certain connection means. In addition, wherever possible, the elements/components/steps denoted by the same reference numbers in the drawings and embodiment represent the same or similar portions. The elements/components/steps denoted by the same reference numbers or recited in the same manner in different embodiments may serve as cross-reference for each other.

FIG. 1A is a circuit diagram of an optical sensor circuit 100 operating under a charging mode according to an embodiment of the disclosure. Referring to FIG. 1A, when the optical sensor circuit 100 operates under the charging mode, the optical sensor circuit 100 includes an output stage circuit 110, a sensor 120, and a sensor 130. The output stage circuit 110 includes capacitors C1 and C2 and transistors T7 and T8. The capacitor C1 is coupled between the node P1 and the reference voltage VREF. The capacitor C2 is coupled between the node P2 and the reference voltage VREF. The first end of the transistor T7 is coupled to the node P1, the second end of the transistor T7 is coupled to the output line OL, and the control end of the transistor T7 receives the driving signal Gn(t). The first end of the transistor T8 is coupled to the node P2, the second end of the transistor T8 is coupled to the node P1, and the control end of the transistor T8 receives the driving signal Gn(t).

Specifically, when the output stage circuit 110 turns on the transistors T7 and T8 according to the driving signal Gn(t), the first voltage V1 on the node P1 and the second voltage V2 on the node P2 can generate an output voltage VM through the charge sharing effect of the capacitor. In other words, the output stage circuit 110 of the present embodiment can transmit the output voltage VM to the output line OL according to the driving signal Gn(t), and transmit the output voltage VM to the readout circuit (not shown) at the back end through the output line OL, such that the readout circuit can determine the sensing state of the optical sensor circuit 100 according to the output voltage VM under the charging mode.

The sensor 120 is coupled to the node P1. Specifically, the sensor 120 includes transistors T1 to T3. The first end of the transistor T1 is coupled to the node P3, and the second end of the transistor T1 and the control end are commonly coupled to the node P1. The first end of the transistor T2 receives the driving signal Sn(t), and the second end of the transistor T2 and the control end are commonly coupled to the node P3. The first end of the transistor T3 and the control end are commonly coupled to the first system voltage VSS, and the second end of the transistor T3 is coupled to the node P3. It should be mentioned that in the embodiment, the color filter FR may cover the transistor T1 and the transistor T2, and the color filter FG may cover the transistor T3. Specifically, the voltage level of the first system voltage VSS may be, for example, a low voltage level.

Specifically, the sensor 120 of the embodiment may sense the first color light of the ambient light by using the transistors T1 and T2 covering the color filter FR, and the transistor T1 and the transistor T2 may generate photocurrent I1 and photocurrent I2 respectively according to the first color light. In addition, the sensor 120 may also sense the second color light of the ambient light by using the transistor T3 covering the color filter FG, and the transistor T3 can generate the photocurrent I3 according to the second color light. Incidentally, in the sensor 120, the width of the transistor T3 can be designed to be longer than the width of the transistor T1 and the transistor T2 (for example, the width of the transistor T3 is designed to be two times the width of the transistor T1 and the transistor T2, wherein the widths of the transistor T1 and the transistor T2 are the same, but the embodiment is not limited thereto), thereby improving the driving ability of the photocurrent I3.

On the other hand, the sensor 130 is coupled to the node P2. The sensor 130 includes transistors T4 to T6. The first end of the transistor T4 is coupled to the node P4, and the second end of the transistor T4 and the control end are commonly coupled to the node P2. The first end of the transistor T5 receives the driving signal Sn(t), and the second end of the transistor T5 and the control end are commonly coupled to the node P4. The first end of the transistor T6 and the control end are commonly coupled to the first system voltage VSS, and the second end of the transistor T6 is coupled to the node P4. It should be mentioned that in the embodiment, the color filter FB can cover the transistor T4 and the transistor T5, and the color filter FG can cover the transistor T6.

Specifically, the sensor 130 of the embodiment may sense the third color light of the ambient light by using the transistors T4 and T5 covering the color filter FB, and the transistor T4 and the transistor T5 may generate photocurrent I4 and photocurrent I5 respectively according to the third color light. In addition, the sensor 130 can also sense the second color light of the ambient light by using the transistor T6 covering the color filter FG, and the transistor T6 can generate the photocurrent I6 according to the second color light. Incidentally, in the sensor 130, the width of the transistor T6 can be designed to be longer than the width of the transistor T4 and the transistor T5 (for example, the width of the transistor T6 is designed to be two times the width of the transistor T4 and the transistor T5, wherein the widths of the transistor T4 and the transistor T5 are the same, but the embodiment is not limited thereto), thereby improving the driving ability of the photocurrent I6.

It should be noted that, in the embodiment shown in FIG. 1A, the color filter FR, the color filter FG, and the color filter FB have a plurality of different pass wavelengths, respectively. Specifically, the color of the color filter FR, the color filter FG, and the color filter FB of the present embodiment may be red, green, and blue, respectively, but the disclosure is not limited thereto. On the other hand, the wavelengths of the first to third color lights described above are different from each other. The first color light of the embodiment may be, for example, red color light of ambient light; the second color light may be, for example, green color light of ambient light; and the third color light may be, for example, blue color light of ambient light, but the disclosure is not limited thereto.

Figure 1B:
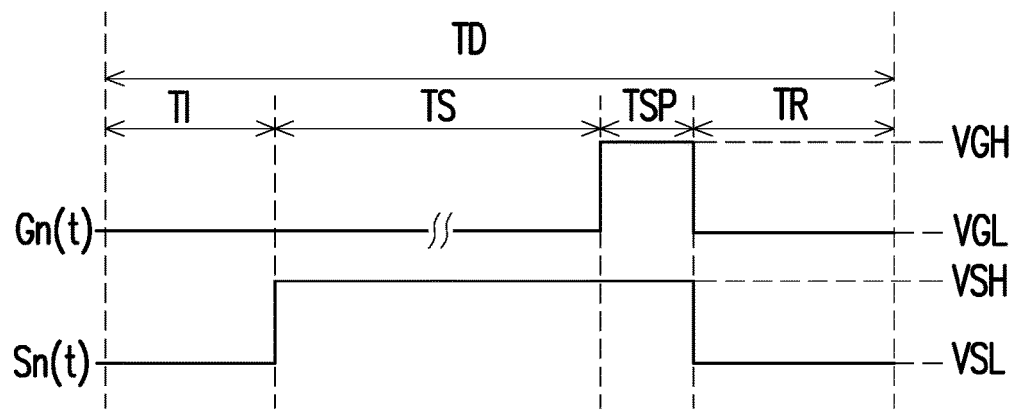
FIG. 1B is a schematic waveform diagram of an optical sensor circuit according to an embodiment in FIG. 1A.

FIG. 1B is a schematic waveform diagram of an optical sensor circuit 100 according to an embodiment in FIG. 1A. Referring to FIG. 1B, in the embodiment, one display time interval TD of the optical sensor circuit 100 can be divided into an initial phase TI, a sensing phase TS, a sampling phase TSP, and a reset phase TR, and the initial phase TI, the sensing phase TS, the sampling phase TSP, and the reset phase TR do not overlap each other. Specifically, the sensing phase TS follows the initial phase TI, the sampling phase TSP follows the sensing phase TS, and the reset phase TR follows the sampling phase TSP.

Regarding the operation details of the optical sensor circuit 100 operating under the charging mode, please refer to FIG. 1A and FIG. 1B at the same time. In detail, when the optical sensor circuit 100 operates in the initial phase TI, the output stage circuit 110 can receive the driving signal Gn(t) having the low voltage level VGL, and the sensor 120 and the sensor 130 can respectively receive the drive signal Sn(t) having a low voltage level VSL. Under this circumstances, the optical sensor circuit 100 can perform an initialization action on the first voltage V1 on the node P1 and the second voltage V2 on the node P2.

Next, when the optical sensor circuit 100 is operating in the sensing phase TS, the optical sensor circuit 100 can begin sensing different color lights from the environment. At the same time, the output stage circuit 110 can continuously receive the driving signal Gn(t) having the low voltage level VGL, and the sensor 120 and the sensor 130 can respectively receive the driving signal Sn(t) having the high voltage level VSH.

In the present embodiment, when the optical sensor circuit 100 senses the white color light of the ambient light, since the spectrum of the white color light has the bands of all color lights (for example, red color light, green color light, and blue color light), the transistors T1 to T6 can respectively generate the photocurrents I1 to I6 according to the color lights. Further, for the portion of the sensor 120, in the case where the optical sensor circuit 100 senses only the white color light, since the width of the transistor T3 is designed to be longer than the width of the transistors T1, T2, at a transient time, the current value of the pull-down current (i.e., photocurrent I3) generated by the transistor T3 may be higher than the current value of the pull-up current (i.e., the photocurrent I1 and the photocurrent I2) generated by the transistor T1 and the transistor T2. In this manner, the first voltage V1 on the node P1 can be pulled down to the low voltage level VL according to the photocurrent I3 and the first system voltage VSS.

In contrast, for the portion of sensor 130, since the width of the transistor T6 is designed to be longer than the width of the transistors T4 and T5, the current value of the pull-down current (i.e., the photocurrent I6) generated by the transistor T6 during the transient time may be higher than the current value of the pull-up current (i.e., the photocurrent I4 and the photocurrent I5) generated by the transistor T4 and the transistor T5. In this case, the second voltage V2 on the node P2 can be pulled down to the low voltage level VL according to the photocurrent I6 and the first system voltage VSS.

In the above case, when the optical sensor circuit 100 operates in the sampling phase TSP, the output stage circuit 110 can turn on the transistor T7 and the transistor T8 according to the driving signal Gn(t) pulled up to the high voltage level VGH. Then, the output stage circuit 110 can generate the output voltage VM based on the charge sharing effect of the capacitor according to the first voltage V1 and the second voltage V2 having the low voltage level VL. Next, the output stage circuit 110 can transmit the output voltage VM to the output line OL. Specifically, the output voltage VM can operate at a low voltage level VL.

On the other hand, when the optical sensor circuit 100 senses the white color light and the blue color light (i.e., the third color light) of the ambient light simultaneously, since the brightness (or energy) of the blue color light is higher as compared with the condition that only the white color light is sensed by the optical sensor circuit 100, and the color filter FB for sensing the blue color light covers the transistor T4 and the transistor T5 of the sensor 130, at the transient time, the current value of the pull-up current (i.e0, the photocurrent I4 and the photocurrent I5) in the sensor 130 may be higher than the current value of the pull-down current (i.e., the photocurrent I6). In this case, the second voltage V2 on the node P2 can be pulled up to the high voltage level VH according to the photocurrent I4, the photocurrent I5, and the driving signal Sn(t).

In contrast, for the portion of sensor 120, since the sensor 120 does not sense the additional red color light at this time, at the transient time, the current value of the pull-down current (i.e., the photocurrent I3) in the sensor 120 will still be higher than the pull-up current (i.e., the photocurrent I1 and the photocurrent I2) in the sensor 120. In this case, the first voltage V1 on the node P1 is pulled down to the low voltage level VL according to the photocurrent I3 and the first system voltage VSS.

In the above case, when the optical sensor circuit 100 operates in the sampling phase TSP, the output stage circuit 110 can turn on the transistor T7 and the transistor T8 according to the driving signal Gn(t) pulled up to the high voltage level VGH. Then, the output stage circuit 110 can generate the output voltage VM based on the charge sharing effect of the capacitor according to the first voltage V1 having the low voltage level VL and the second voltage V2 having the high voltage level VH. Next, the output stage circuit 110 can transmit the output voltage VM to the output line OL. It should be noted that the output voltage VM at this time can operate at half of the low voltage level VL.

On the other hand, when the optical sensor circuit 100 senses the white color light and the red color light (i.e., the first color light) of the ambient light simultaneously, since the brightness (or energy) of the red color light is higher as compared with the condition that only the white color light is sensed by the optical sensor circuit 100, and the color filter FR for sensing the red color light covers the transistor T1 and the transistor T2 of the sensor 120, at the transient time, the current value of the pull-up current (i.e., photocurrent I1 and photocurrent I2) in the sensor 120 may be higher than the current value of the pull-down current (i.e., the photocurrent I3). In this case, the first voltage V1 on the node P1 can be pulled up to the high voltage level VH according to the photocurrent I1, the photocurrent I2, and the driving signal Sn(t).

In contrast, for the portion of sensor 130, since the sensor 130 does not sense additional blue color light at this time, at the transient time, the current value of the pull-down current (i.e., the photocurrent I6) in the sensor 130 is higher than the pull-up current (i.e., the photocurrent I4 and the photocurrent I5) in the sensor 130. In this case, the second voltage V2 on the node P2 is pulled down to the low voltage level VL according to the photocurrent I6 and the first system voltage VSS.

In the above case, when the optical sensor circuit 100 operates in the sampling phase TSP, the output stage circuit 110 can turn on the transistor T7 and the transistor T8 according to the driving signal Gn(t) pulled up to the high voltage level VGH. Then, the output stage circuit 110 can generate the output voltage VM based on the charge sharing effect of the capacitor according to the first voltage V1 having the high voltage level VH and the second voltage V2 having the low voltage level VL. It should be noted that the output voltage VM at this time can also operate at half of the low voltage level VL.

On the other hand, when the optical sensor circuit 100 senses the white color light, the red color light (i.e., the first color light) and the blue color light (i.e., the third color light) of the ambient light simultaneously, since the brightness (or energy) of the red color light at this time is higher than the condition that only the white light color is sensed by the optical sensor circuit 100, and the color filter FR for sensing the red color light covers the transistor T1 and the transistor T2 of the sensor 120, at the transient time, the current value of the pull-up current (i.e., the photocurrent I1 and the photocurrent I2) in the sensor 120 may be higher than the current value of the pull-down current (i.e., the photocurrent I3). In this case, the first voltage V1 on the node P1 can be pulled up to the high voltage level VH according to the photocurrent I1, the photocurrent I2, and the driving signal Sn(t).

In contrast, since the brightness (or energy) of the blue color light is higher than the condition that only the white color light is sensed by the optical sensor circuit 100, and the color filter FB for sensing the blue color light covers the transistor T4 and the transistor T5 of the sensor 130, at the transient time, the current value of the pull-up current (i.e., the photocurrent I4 and the photocurrent I5) in the sensor 130 may be higher than the current value of the pull-down current (i.e., the photocurrent I6). In this case, the second voltage V2 on the node P2 can be pulled up to the high voltage level VH according to the photocurrent I4, the photocurrent I5, and the driving signal Sn(t).

In the above case, when the optical sensor circuit 100 operates in the sampling phase TSP, the output stage circuit 110 can turn on the transistor T7 and the transistor T8 according to the driving signal Gn(t) pulled up to the high voltage level VGH. Then, the output stage circuit 110 can generate the output voltage VM based on the charge sharing effect of the capacitor according to the first voltage V1 and the second voltage V2 having the high voltage level VH. It should be noted that the output voltage VM at this time can operate at the high voltage level VH.

In particular, when the optical sensor circuit 100 operates in the reset phase TR, the output stage circuit 110 can receive the driving signal Gn(t) having the low voltage level VGL, and the sensor 120 and the sensor 130 may respectively receive a driving signal Sn(t) having a low voltage level VSL. In this case, the optical sensor circuit 100 can perform a reset action on the first voltage V1 on the node P1 and the second voltage V2 on the node P2.

According to the description for the embodiment of FIG. 1A above, it can be obtained that in the sensing phase TS under the charging mode, when the sensor 120 senses the additional red color light (i.e., the first color light), and the sensor 130 also senses the additional blue color light (i.e., a third color light) simultaneously, the sensor 120 can adjust (e.g., pull up) the voltage level of the first voltage V1 according to the photocurrent I1, the photocurrent I2, and the driving signal Sn(t). Meanwhile, the sensor 130 can adjust (e.g., pull up) the voltage level of the second voltage V2 according to the photocurrent I4, the photocurrent I5, and the driving signal Sn(t). In contrast, when the sensor 120 and the sensor 130 do not simultaneously sense the additional red color light (i.e., first color light) and the blue color light (i.e., third color light), the sensor 120 may pull down the voltage level of the first voltage V1 according to the photocurrent I3. Moreover, the sensor 130 can pull down the voltage level of the second voltage V2 according to the photocurrent I6.

In other words, in the embodiment of the disclosure, when the optical sensor circuit 100 operates under the charging mode, when the optical sensor circuit 100 senses the additional red color light (i.e., first color light) and the blue color light (i.e., third color light) simultaneously, the first voltage V1 on the node P1 and the second voltage V2 on the node P2 both can be maintained at a high voltage level without being pulled down to a low voltage level due to the influence of the white color light of the ambient light, thereby ensuring that the optical sensor circuit 100 can operate normally in the sensing phase TS under the charging mode.

Figure 2A:
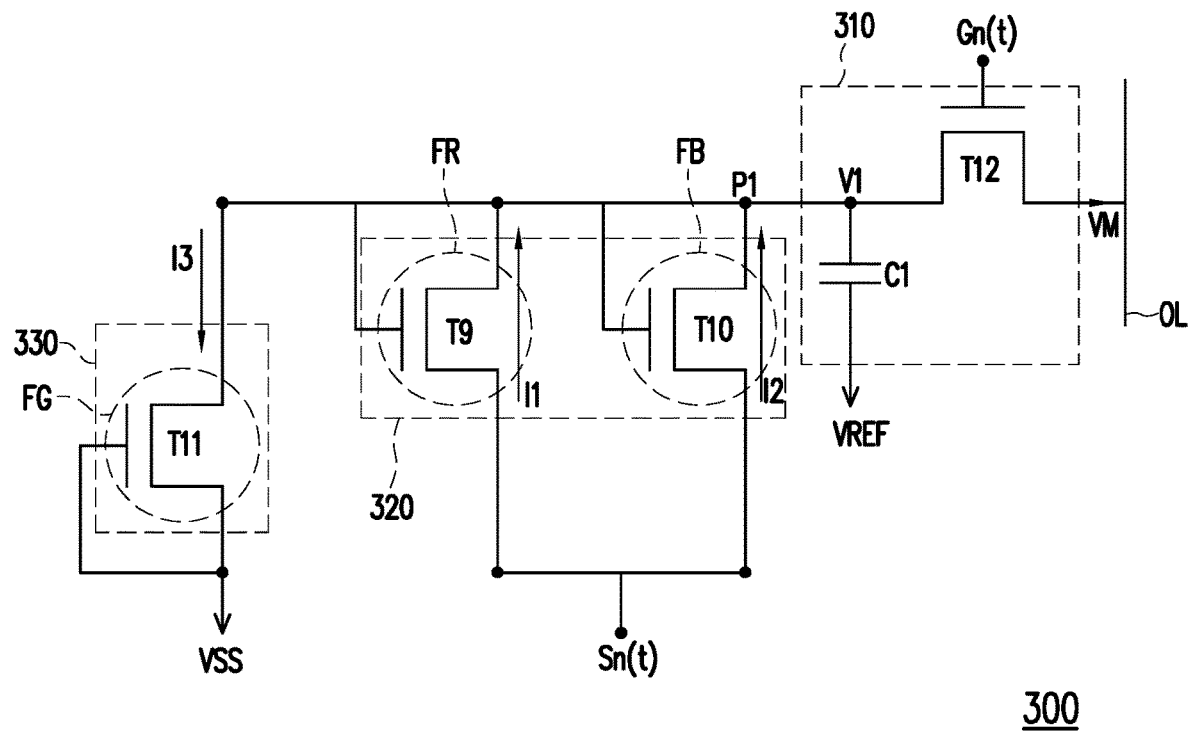
FIG. 2A is a circuit diagram of an optical sensor circuit operating under a charging mode according to another embodiment of the disclosure.

FIG. 2A is a circuit diagram of an optical sensor circuit 300 operating under the charging mode according to another embodiment of the disclosure. Referring to FIG. 2A, when the optical sensor circuit 300 operates under the charging mode, the optical sensor circuit 300 includes an output stage circuit 310, a sensor 320, and a sensor 330. The output stage circuit 310 includes a capacitor C1 and a transistor T12. The capacitor C1 is coupled between the node P1 and the reference voltage VREF. The first end of the transistor T12 is coupled to the node P1, the second end of the transistor T12 is coupled to the output line OL, and the control end of the transistor T12 receives the driving signal Gn(t).

Specifically, when the output stage circuit 310 turns on the transistor T12 according to the driving signal Gn(t), the output stage circuit 310 can transmit the first voltage V1 on the node P1 to the output line OL and transmit the first voltage V1 to a readout circuit (not shown) at the back end through the output line OL, such that the readout circuit can determine the sensing state of the optical sensor circuit 300 according to the first voltage V1 under the charging mode.

The sensor 320 is coupled to the node P1. Specifically, the sensor 320 includes transistors T9 and T10. The first end of the transistor T9 receives the driving signal Sn(t), and the second end of the transistor T9 and the control end are commonly coupled to the node P1. The first end of the transistor T10 receives the driving signal Sn(t), and the second end of the transistor T10 and the control end are commonly coupled to the node P1. It should be mentioned that in the embodiment, the color filter FR may cover the transistor T9, and the color filter FB may cover the transistor T10.

Specifically, the sensor 320 of the embodiment may sense the first color light of the ambient light by using the transistor T9 covering the color filter FR, such that the transistor T9 generates the photocurrent I1 according to the first color light. Moreover, the sensor 320 can also sense the second color light of the ambient light by using the transistor T10 covering the color filter FB, such that the transistor T10 generates the photocurrent I2 according to the second color light.

On the other hand, the sensor 330 is coupled between the node P1 and the first system voltage VSS. Specifically, the sensor 330 includes a transistor T11. The first end of the transistor T11 and the control end are commonly coupled to the first system voltage VSS, and the second end of the transistor T11 is coupled to the node P1. Specifically, the voltage level of the first system voltage VSS may be, for example, a low voltage level. It should be mentioned that in the embodiment, the color filter FG can cover the transistor T11. Specifically, the sensor 330 of the present embodiment can sense the third color light of the ambient light by using the transistor T11 covering the color filter FG, such that the transistor T11 can generate the photocurrent I3 according to the third color light.

It should be noted that in the embodiment shown in FIG. 2A, the above-mentioned color filter FR, color filter FG and color filter FB also have a plurality of different pass wavelengths, respectively. The color of the color filter FR, the color filter FG, and the color filter FB of the present embodiment may be red, green, and blue, respectively, but the present disclosure is not limited thereto. On the other hand, the wavelengths of the first to third color lights described above are different from each other. Different from the embodiment of FIG. 1A, the first color light of the embodiment may be, for example, red color light of ambient light; the second color light may be, for example, blue color light of ambient light; and the third color light may be, for example, green color light of ambient light, but the disclosure is not limited thereto.

In particular, in the present embodiment, the width of the transistor T11 can be designed to be longer than the width of the transistor T9 and the transistor T10 (for example, the width of the transistor T11 is designed to be 4 times the width of the transistor T9 and the transistor T10, wherein the widths of the transistor T9 and the transistor T10 are the same, but the embodiment is not limited thereto), thereby improving the driving ability of the photocurrent I3.

Figure 2B:
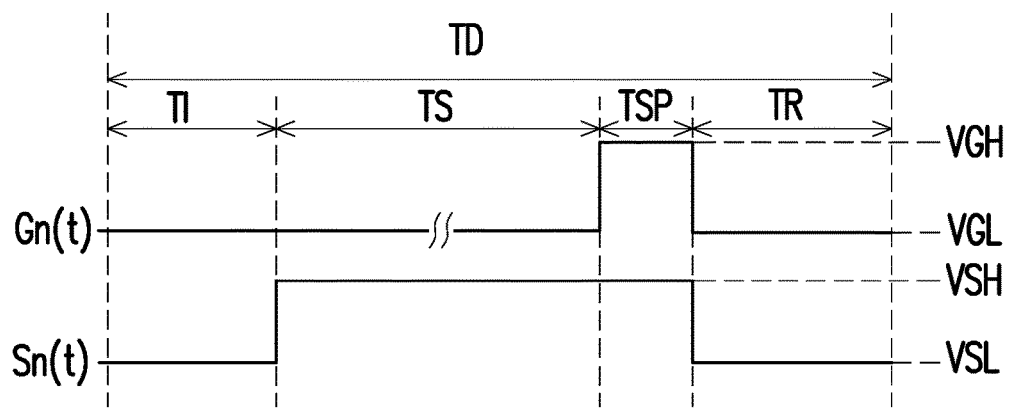
FIG. 2B is a schematic waveform diagram of an optical sensor circuit according to another embodiment in FIG. 2A.

FIG. 2B is a schematic waveform diagram of an optical sensor circuit 300 according to another embodiment in FIG. 2A. The schematic waveform diagram shown in FIG. 2B is the same or similar to the waveform diagram of FIG. 1B, and the descriptions of the various stages are described in detail in FIG. 1B and thus will be omitted herein.

Regarding the operation details of the optical sensor circuit 300 operating under the charging mode, please refer to FIG. 2A and FIG. 2B. When the optical sensor circuit 300 operates in the initial phase TI, the output stage circuit 310 can receive the driving signal Gn(t) having the low voltage level VGL, and the sensor 320 can receive the driving signal Sn(t) having the low voltage level VSL. In this case, the optical sensor circuit 300 can perform an initialization action on the first voltage V1 on the node P1.

Next, when the optical sensor circuit 300 operates in the sensing phase TS, the optical sensor circuit 300 can begin to sense different color lights from the environment. Meanwhile, the output stage circuit 310 can receive the driving signal Gn(t) having the low voltage level VGL, and the sensor 320 can receive the driving signal Sn(t) having the high voltage level VSH.

In the present embodiment, when the optical sensor circuit 300 senses the white color light of the ambient light, since the spectrum of the white color light has the bands of all color lights (for example, red color light, green color light, and blue color light), the transistors T9 to T11 can generate the photocurrents I1 to I3 respectively according to the color lights.

In detail, in the embodiment, when the optical sensor circuit 300 senses the white color light of the ambient light, since the width of the transistor T11 is designed to be longer than the width of the transistors T9 and T10, at a transient time, the current value of the pull-down current (that is, the photocurrent I3) generated by the transistor T11 may be higher than the current value of the pull-up current (i.e., the photocurrent I1 and the photocurrent I2) generated by the transistor T9 and the transistor T10. In this manner, the first voltage V1 on the node P1 can be pulled down to the low voltage level VL according to the photocurrent I3 and the first system voltage VSS.

In the above case, when the optical sensor circuit 300 operates in the sampling phase TSP, the output stage circuit 310 can turn on the transistor T12 according to the driving signal Gn(t) pulled up to the high voltage level VGH. Next, the output stage circuit 310 can transmit the first voltage V1 having the low voltage level VL to the output line OL.

On the other hand, when the optical sensor circuit 300 senses the white color light and the blue color light (i.e., the second color light) of the ambient light simultaneously, the transistor T10 can sense the additional blue color light to enhance the current value of the photocurrent I2. It should be noted that since the transistor T9 does not sense the additional red color light at this time, the photocurrent I1 is not sufficient to pull up the voltage level of the first voltage V1. Moreover, in this embodiment, the width of the transistor T11 can be designed to be longer than the width of the transistor T9 and the transistor T10. Therefore, at the transient time, the current value of the pull-down current (i.e., the photocurrent I3) generated by the sensor 330 can still be higher than the pull-up current (i.e., the photocurrent I1 and the photocurrent I2) generated by the sensor 320. In this case, the first voltage V1 on the node P1 can be pulled down to the low voltage level VL according to the photocurrent I3 and the first system voltage VSS.

In the above case, when the optical sensor circuit 300 operates in the sampling phase TSP, the output stage circuit 310 can turn on the transistor T12 according to the driving signal Gn(t) pulled up to the high voltage level VGH. Next, the output stage circuit 310 can transmit the first voltage V1 having the low voltage level VL to the output line OL.

On the other hand, when the optical sensor circuit 300 senses the white color light and the red color light (i.e., the first color light) of the ambient light simultaneously, the transistor T9 can sense the additional red color light to increase the current value of the photocurrent I1. It should be noted that since the transistor T10 does not sense the additional blue color light at this time, the photocurrent I2 is not sufficient to pull up the voltage level of the first voltage V1. Moreover, in this embodiment, the width of the transistor T11 can be designed to be longer than the width of the transistor T9 and the transistor T10. Therefore, in the transient time, the current value of the pull-down current (i.e., the photocurrent I3) generated by the sensor 330 can still be higher than the pull-up current (i.e., the photocurrent I1 and the photocurrent I2) generated by the sensor 320. In this case, the first voltage V1 on the node P1 can be pulled down to the low voltage level VL according to the photocurrent I3 and the first system voltage VSS.

In the above case, when the optical sensor circuit 300 operates in the sampling phase TSP, the output stage circuit 310 can also transmit the first voltage V1 having the low voltage level VL to the output line OL.

On the other hand, when the optical sensor circuit 300 senses the white color light, the red color light (i.e., the first color light), and the blue color light (i.e., the second color light) of the ambient light simultaneously, the transistor T9 can sense the additional red color light to increase the current value of photocurrent I1, and the transistor T10 can sense the additional blue color light to increase the current value of photocurrent I2. In this case, in the transient time, the current value of the pull-up current (i.e., the photocurrent I1 and the photocurrent I2) generated by the sensor 320 may be higher than the current value of the pull-down current (i.e., the photocurrent I3) generated by the sensor 330. In other words, the first voltage V1 on the node P1 can be pulled up to the high voltage level VH according to the photocurrent I1, the photocurrent I2, and the driving signal Sn(t).

In the above case, when the optical sensor circuit 300 operates in the sampling phase TSP, the output stage circuit 310 can transmit the first voltage V1 having the high voltage level VH to the output line OL.

In particular, when the optical sensor circuit 300 operates in the reset phase TR, the output stage circuit 310 can receive the driving signal Gn(t) having the low voltage level VGL, and the sensor 320 can receive the driving signal Sn(t) having the low voltage level. In this case, the optical sensor circuit 300 can perform a reset action on the first voltage V1 on the node P1.

According to the description of the embodiment of FIG. 2A above, it can be obtained that in the sensing phase TS under the charging mode, when the sensor 320 senses the additional red color light (i.e., first color light) and the blue color light (i.e., second color light) simultaneously, the sensor 320 can adjust (e.g., pull up) the voltage level of the first voltage V1 according to the photocurrent I1, the photocurrent I2, and the driving signal Sn(t). In contrast, when the sensor 320 does not sense the additional red color light (i.e., first color light) and the blue color light (i.e., second color light) simultaneously, the sensor 330 can adjust (e.g., pull down) the voltage level of the first voltage V1 according to the photocurrent I3 and the first system voltage VSS.

In other words, in the embodiment of the disclosure, when the optical sensor circuit 300 operates under the charging mode, when the sensor 320 simultaneously senses the additional red color light (i.e., first color light) and the blue color light (i.e., second color light), the first voltage V1 on the node P1 can be maintained at a high voltage level without being influenced by the white color light of the ambient light and pulled down to a low voltage level, thereby ensuring that the optical sensor circuit 300 can be normally operated in the sensing phase TS under the charging mode.

Figure 3A:
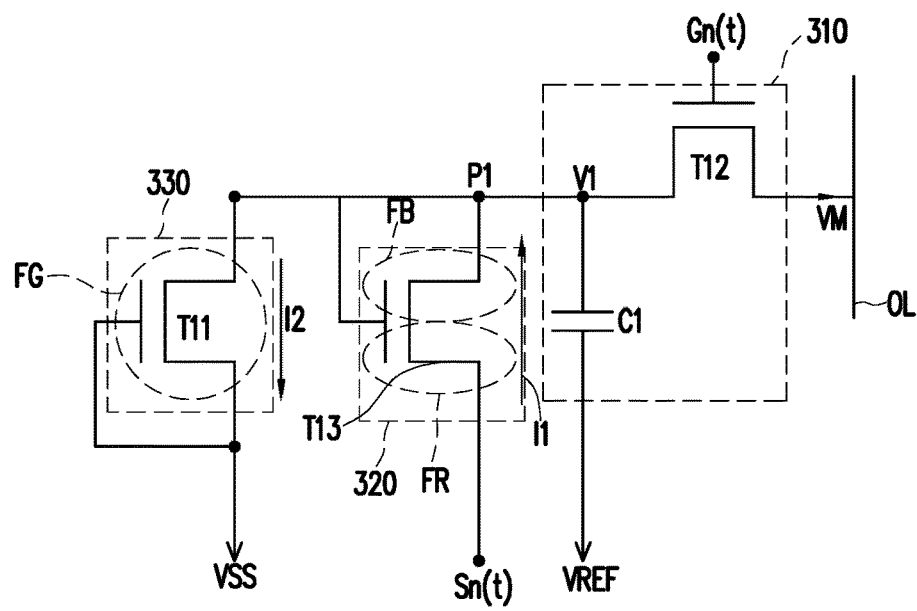
FIG. 3A is a circuit diagram of an optical sensor circuit operating under a charging mode according to yet another embodiment of the disclosure.

FIG. 3A is a circuit diagram of an optical sensor circuit 500 operating under the charging mode according to yet another embodiment of the disclosure. Referring to FIG. 2A and FIG. 3A, in the present embodiment, the optical sensor circuit 500 is substantially the same as the optical sensor circuit 300, wherein the same or similar elements are denoted by the same or similar reference numerals. Different from the embodiment of FIG. 2A, in the optical sensor circuit 500, the sensor 320 can be implemented by the transistor T13. The first end of the transistor T13 receives the driving signal Sn(t), and the second end of the transistor T13 and the control end are commonly coupled to the node P1. It should be noted that, in this embodiment, the color filter FR may cover the first portion of the transistor T13, and the color filter FB may cover the second portion of the transistor T13, wherein the first portion and the second portion do not completely overlap each other. It should be noted that the output stage circuit 310, the sensor 320 and the sensor 330 of the optical sensor circuit 500 can be inferred based on the descriptions regarding the output stage circuit 310, the sensor 320 and the sensor 330 mentioned in FIG. 2A and FIG. 2B, and will not be repeated herein.

Figure 3B:
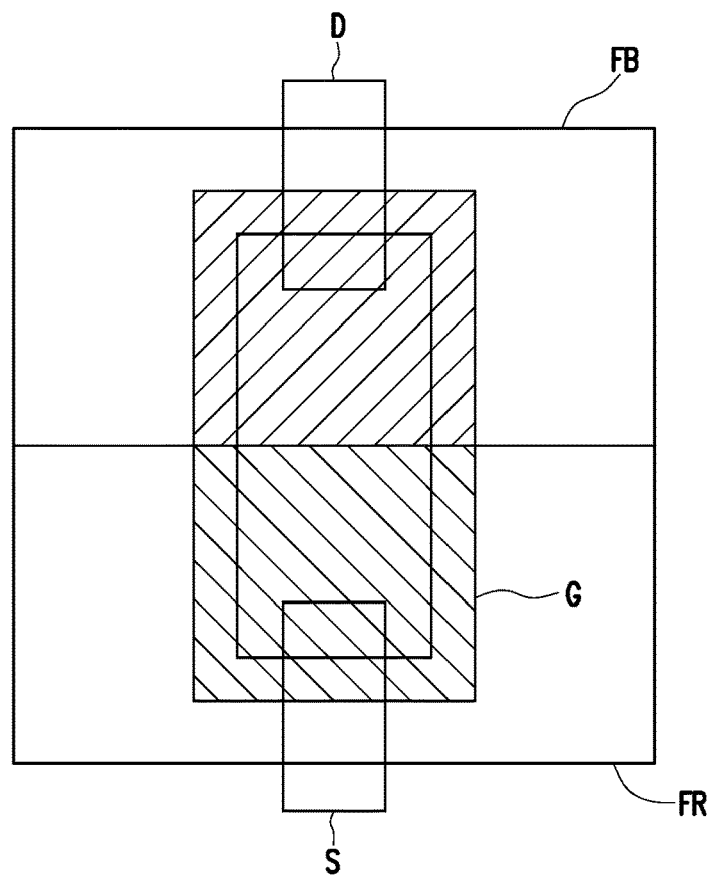
FIG. 3B is a top view of a first transistor according to the embodiment of FIG. 3A.

FIG. 3B is a top view of a first transistor T13 according to the embodiment of FIG. 3A of the disclosure. Referring to FIG. 3A and FIG. 3B, in the embodiment, the transistor T13 has a first end (corresponding to the source terminal S), a second end (corresponding to the drain terminal D), and a control end (corresponding to the gate terminal G). In detail, the red color filter FR may cover the source terminal S of the transistor T13 and a portion of the gate terminal G (for example, the portion oblique to the right in FIG. 3B), and the blue color filter FB may cover the drain terminal D of the transistor T13 and another portion of the gate terminal G (for example, the portion oblique to the left in FIG. 3B).

Specifically, in this embodiment, the optical sensor circuit 500 can utilize the first portion (e.g., the portion oblique to the right in FIG. 3B) of the transistor T13 to sense the red color (i.e., the first color light) of the ambient light, and utilize the second portion (for example, the portion oblique to the left in FIG. 3B) of the transistor T13 to sense the blue color light (i.e., the second color light) of the ambient light. Specifically, the width of the transistor T11 can be designed to be longer than the width of the transistor T13. In other words, when the sensor 320 simultaneously senses the additional red color light (i.e., first color light) and the blue color light (i.e., second color light), since the current value of the pull-up current (i.e., the photocurrent I1) of the sensor 320 at this time is higher than the current value of the pull-down current (i.e., the photocurrent I2) of the sensor 330, the sensor 320 can pull up the first voltage V1 on the node P1 to the high voltage level according to the pull-up current (i.e., the photocurrent I1) and the driving signal Sn(t). In this manner, the first voltage V1 is not pulled down to the low voltage level due to the influence of the white color light of the ambient light, thereby ensuring that the optical sensor circuit 500 can be normally operated in the sensing phase TS under the charging mode.

Figure 4A:
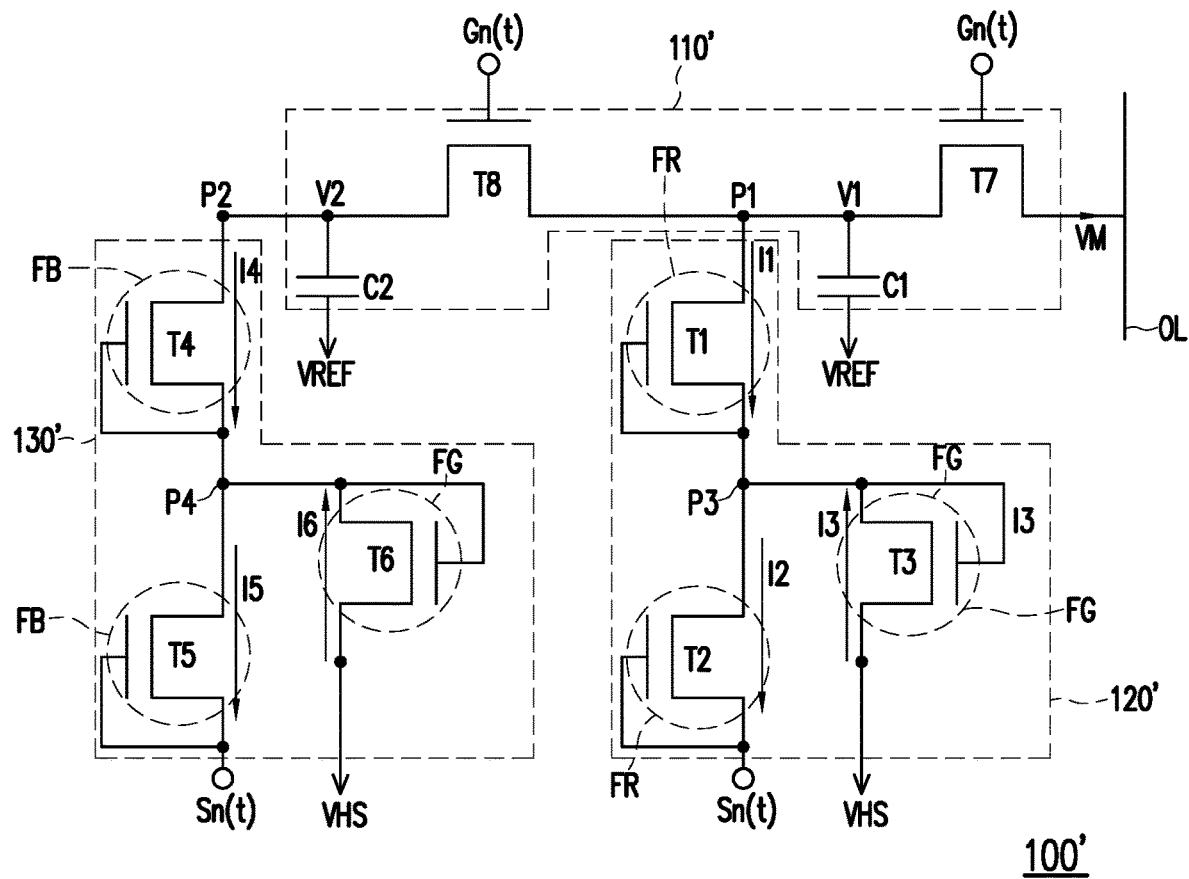
FIG. 4A is a circuit diagram of an optical sensor circuit operating under a discharging mode according to an embodiment of the disclosure.

FIG. 4A is a circuit diagram of an optical sensor circuit 100' operating under a discharging mode according to an embodiment of the present disclosure. Referring to both FIG. 1A and FIG. 4A, the optical sensor circuit 100' of FIG. 4A is substantially identical or similar to the optical sensor circuit 100 of FIG. 1A, wherein the same or similar elements are designated by the same or similar reference numerals. Different from the embodiment of FIG. 1A, the optical sensor circuit 100' of the present embodiment operates under a discharging mode.

When the optical sensor circuit 100' operates under the discharging mode, the optical sensor circuit 100' includes an output stage circuit 110', a sensor 120', and a sensor 130'. Specifically, the output stage circuit 110' includes capacitors C1 and C2 and transistors T7 and T8. The capacitor C1 is coupled between the node P1 and the reference voltage VREF. The capacitor C2 is coupled between the node P2 and the reference voltage VREF. The first end of the transistor T7 is coupled to the node P1, the second end of the transistor T7 is coupled to the output line OL, and the control end of the transistor T7 receives the driving signal Gn(t). The first end of the transistor T8 is coupled to the node P2, the second end of the transistor T8 is coupled to the node P1, and the control end of the transistor T8 receives the driving signal Gn(t).

The operation of the output stage circuit 110' under the discharging mode can be inferred with reference to the related description of the output stage circuit 110 mentioned in FIG. 1A, and therefore will not be described again.

The sensor 120' is coupled to the node P1. Specifically, the sensor 120' includes transistors T1 to T3. The first end and the control end of the transistor T1 are commonly coupled to the node P3, and the second end of the transistor T1 is coupled to the node P1. The first end and the control end of the transistor T2 commonly receive the driving signal Sn(t), and the second end of the transistor T2 is coupled to the node P3. The first end of the transistor T3 is coupled to the second system voltage VHS, and the second end and the control end of the transistor T3 are commonly coupled to the node P3. It should be noted that in this embodiment, the color filter FR may cover the transistor T1 and the transistor T2, and the color filter FG may cover the transistor T3. Specifically, the voltage level of the second system voltage VHS may be, for example, a high voltage level.

The operation of the sensor 120' under the discharging mode and the properties of components can be inferred with reference to the related description of the sensor 120 mentioned in FIG. 1A, and therefore will not be described again.

On the other hand, the sensor 130' is coupled to the node P2. Specifically, the sensor 130' includes transistors T4 to T6. The first end and the control end of the transistor T4 are commonly coupled to the node P4, and the second end of the transistor T4 is coupled to the node P2. The first end and the control end of the transistor T5 commonly receive the driving signal Sn(t), and the second end of the transistor T5 is coupled to the node P4. The first end of the transistor T6 is coupled to the second system voltage VHS, and the second end and the control end of the transistor T6 are commonly coupled to the node P4. It should be noted that in this embodiment, the color filter FB may cover the transistor T4 and the transistor T5, and the color filter FG may cover the transistor T6.

The operation of the sensor 130' under the discharging mode and the properties of components can be inferred with reference to the related description of the sensor 130 mentioned in FIG. 1A, and therefore will not be described again.

Similar to the embodiment of FIG. 1A, the colors of the color filter FR, the color filter FG, and the color filter FB of the present embodiment may be red, green, and blue, respectively, but the present disclosure is not limited thereto. Moreover, the first color light of the embodiment may be, for example, red color light of ambient light; the second color light may be, for example, green color light of ambient light; and the third color light may be, for example, blue color light of ambient light, but the disclosure is not limited thereto.

Figure 4B:
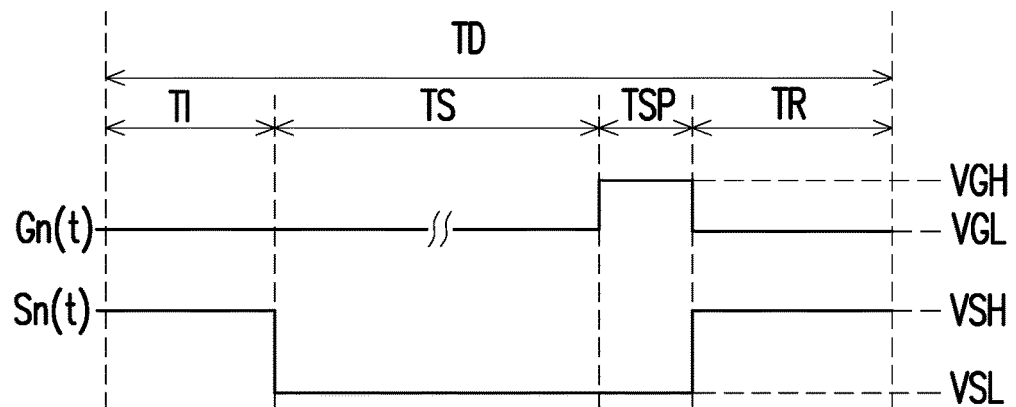
FIG. 4B is a schematic waveform diagram of an optical sensor circuit according to the embodiment in FIG. 4A.

FIG. 4B is a schematic waveform diagram of the optical sensor circuit 100' according to the embodiment of FIG. 4A. Regarding the operation details of the operation of the optical sensor circuit 100' under the discharging mode, please refer to FIG. 4A and FIG. 4B both. In detail, when the optical sensor circuit 100' operates in the initial stage TI, the output stage circuit 110' can receive the driving signal Gn(t) having the low voltage level VGL, and the sensor 120' and the sensor 130' can receive the driving signal Sn(t) having a high voltage level VSH, respectively. In this case, the optical sensor circuit 100' can perform an initialization operation on the first voltage V1 on the node P1 and the second voltage V2 on the node P2.

Next, when the optical sensor circuit 100' operates under the sensing phase TS, the optical sensor circuit 100' can begin sensing different color lights from the environment. In the meantime, the output stage circuit 110' can continuously receive the driving signal Gn(t) having the low voltage level VGL, and the sensor 120' and the sensor 130' can respectively receive the driving signal Sn(t) having the low voltage level VSL.

In the present embodiment, when the optical sensor circuit 100' senses the white color light of the ambient light, since the spectrum of the white color light includes the bands of all the color lights (for example, the red color light, the green color light, and the blue color light), the transistors T1 to T6 can respectively generate the photocurrents I1 to I6 based on the color lights. Further, for the portion of sensor 120', in the case where the optical sensor circuit 100' senses only the white color light, since the width of the transistor T3 is designed to be longer than the width of the transistors T1 and T2, during a transient time, the current value of the pull-up current (i.e., photocurrent I3) generated by the transistor T3 can be higher than the current value of the pull-down current (i.e., the photocurrent I1 and the photocurrent I2) generated by the transistor T1 and the transistor T2. In this manner, the first voltage V1 on the node P1 can be pulled up to the high voltage level VH according to the photocurrent I3 and the second system voltage VHS.

In contrast, for the portion of sensor 130', since the width of the transistor T6 is designed to be longer than the width of the transistors T4 and T5, during the transient time, the current value of the pull-up current (i.e., photocurrent I6) generated by the transistor T6 may be higher than the current value of the pull-down current (i.e., photocurrent I4 and photocurrent I5) generated by the transistor T4 and the transistor T5. In this case, the second voltage V2 on the node P2 can be pulled up to the high voltage level VH according to the photocurrent I6 and the second system voltage VHS.

In the above case, when the optical sensor circuit 100' operates in the sampling phase TSP, the output stage circuit 110' can make the transistor T7 and the transistor T8 to be turned on according to the driving signal Gn(t) pulled up to the high voltage level VGH. Next, the output stage circuit 110' can generate an output voltage VM based on the charge sharing effect of the capacitor according to the first voltage V1 and the second voltage V2 having the high voltage level VH. Next, the output stage circuit 110' can transmit the output voltage VM to the output line OL. Specifically, the output voltage VM can be operated at a high voltage level VH.

On the other hand, when the optical sensor circuit 100' simultaneously senses the white color light and the blue color light (i.e., the third color light) of the ambient light, since the brightness (or energy) of the blue color light at this time is higher as compared with the condition where the optical sensor circuit 100' senses the white color light only, and the color filter FB for sensing the blue color light covers the transistor T4 and the transistor T5 of the sensor 130', during the transient time, the current value of the pull-down current (i.e., photocurrent I4 and photocurrent I5) in the sensor 130' may be higher than the current value of the pull-up current (i.e., the photocurrent I6). In this case, the second voltage V2 on the node P2 can be pulled down to the low voltage level VL according to the photocurrent I4, the photocurrent I5, and the driving signal Sn(t).

In contrast, for the portion of sensor 120', since the sensor 120' does not sense additional red color light at this time, in the transient time, the current value of the pull-up current (i.e., photocurrent I3) in the sensor 120' is still higher than the current value of the pull-down current (i.e., the photocurrent I1 and the photocurrent I2) in the sensor 120'. In this case, the first voltage V1 on the node P1 is pulled up to the high voltage level VH according to the photocurrent I3 and the second system voltage VHS.

In the above case, when the optical sensor circuit 100' operates in the sampling phase TSP, the output stage circuit 110' may generate the output voltage VM based on the charge sharing effect of the capacitor according to the first voltage V1 having the high voltage level VH and the second voltage V2 having the low voltage level VL. Next, the output stage circuit 110 can transmit the output voltage VM to the output line OL. It should be noted that the output voltage VM at this time can operate at half of the low voltage level VL.

On the other hand, when the optical sensor circuit 100' simultaneously senses the white color light and the red color light (i.e., the first color light) of the ambient light, since the brightness (or energy) of the red color light is higher as compared with the condition where the optical sensor circuit 100' senses the white color light only, and the color filter FR for sensing the red color light covers the transistor T1 and the transistor T2 of the sensor 120', in the transient time, the current value of the pull-down current (i.e., the photocurrent I1 and the photocurrent I2) in the sensor 120' may be higher than the current value of the pull-up current (i.e., the photocurrent I3). In this case, the first voltage V1 on the node P1 can be pulled down to the low voltage level VL according to the photocurrent I1, the photocurrent I2, and the driving signal Sn(t).

In contrast, for the portion of sensor 130', since the sensor 130' does not sense additional blue color light at this time, in the transient time, the current value of the pull-up current (i.e., photocurrent I6) in the sensor 130' is higher than the current value of the pull-down current (i.e., photocurrent I4 and photocurrent I5) in the sensor 130'. In this case, the second voltage V2 on the node P2 is pulled up to the high voltage level VH according to the photocurrent I6 and the second system voltage VHS.

In the above case, when the optical sensor circuit 100' operates in the sampling phase TSP, the output stage circuit 110' may generate an output voltage VM based on the charge sharing effect of the capacitor according to the first voltage V1 having the low voltage level VL and the second voltage V2 having the high voltage level VH. It should be noted that the output voltage VM at this time can also operate at half of the low voltage level VL.

On the other hand, when the optical sensor circuit 100' simultaneously senses the white color light, the red color light (i.e., the first color light), and the blue color light (i.e., the third color light) of the ambient light, since the brightness (or energy) of the red color light at this time is higher as compared with the condition where the optical sensor circuit 100' senses the white color light only, and the color filter FR for sensing the red color light covers the transistor T1 and the transistor T2 of the sensor 120', during the transient time, the current value of the pull-down current (i.e., the photocurrent I1 and the photocurrent I2) in the sensor 120' may be higher than the current value of the pull-up current (i.e., the photocurrent I3). In this case, the first voltage V1 on the node P1 can be pulled down to the low voltage level VL according to the photocurrent I1, the photocurrent I2, and the driving signal Sn(t).

In contrast, since the brightness (or energy) of the blue color light at this time is higher as compared with the condition where the optical sensor circuit 100' senses the white color light only, and the color filter FB for sensing the blue color light covers the transistor T4 and the transistor T5 of the sensor 130', in the transient time, the current value of the pull-down current (i.e., photocurrent I4 and photocurrent I5) in the sensor 130' may be higher than the current value of the pull-up current (i.e., photocurrent I6). In this case, the second voltage V2 on the node P2 can be pulled down to the low voltage level VL according to the photocurrent I4, the photocurrent I5, and the driving signal Sn(t).

In the above case, when the optical sensor circuit 100' operates in the sampling phase TSP, the output stage circuit 110' may generate an output voltage VM based on the charge sharing effect of the capacitor according to the first voltage V1 and the second voltage V2 having the low voltage level VL. It should be noted that the output voltage VM at this time can operate at the low voltage level VL.

Specifically, when the optical sensor circuit 100' operates in the reset phase TR, the output stage circuit 110' can receive the driving signal Gn(t) having the low voltage level VGL, and the sensor 120' and the sensor 130' can receive the driving signal Sn(t) having a high voltage level VSH, respectively. In this case, the optical sensor circuit 100' can perform a reset operation on the first voltage V1 on the node P1 and the second voltage V2 on the node P2.

According to the above description of the embodiment of FIG. 4A, it can be obtained that in the sensing phase TS under the discharging mode, when the sensor 120' senses additional red color light (i.e., the first color light), and when the sensor 130' simultaneously senses the additional blue color light (i.e., the third color light), the sensor 120' can adjust (e.g., pull down) the voltage level of the first voltage V1 according to the photocurrent I1, the photocurrent I2, and the driving signal Sn(t). In the meantime, the sensor 130' can adjust (e.g., pull down) the voltage level of the second voltage V2 according to the photocurrent I4, the photocurrent I5, and the driving signal Sn(t). In contrast, when the sensor 120' and the sensor 130' do not simultaneously sense the additional red color light (i.e., first color light) and the blue color light (i.e., third color light), the sensor 120' can pull up the voltage level of the first voltage V1 according to the photocurrent I3. Moreover, the sensor 130' can pull up the voltage level of the second voltage V2 according to the photocurrent I6.

In other words, in the embodiment of the present disclosure, in the case that the optical sensor circuit 100' operates under the discharging mode, when the optical sensor circuit 100' senses the additional red color light (i.e., the first color light) and the blue color light (i.e., the third color light) simultaneously, the first voltage V1 on the node P1 and the second voltage V2 on the node P2 can be maintained at the state of low voltage level without being affected by the white color light of the ambient light and pulled up to the high voltage level, thereby ensuring that the optical sensor circuit 100' can be normally operated in the sensing phase TS under the discharging mode.

Figure 5A:
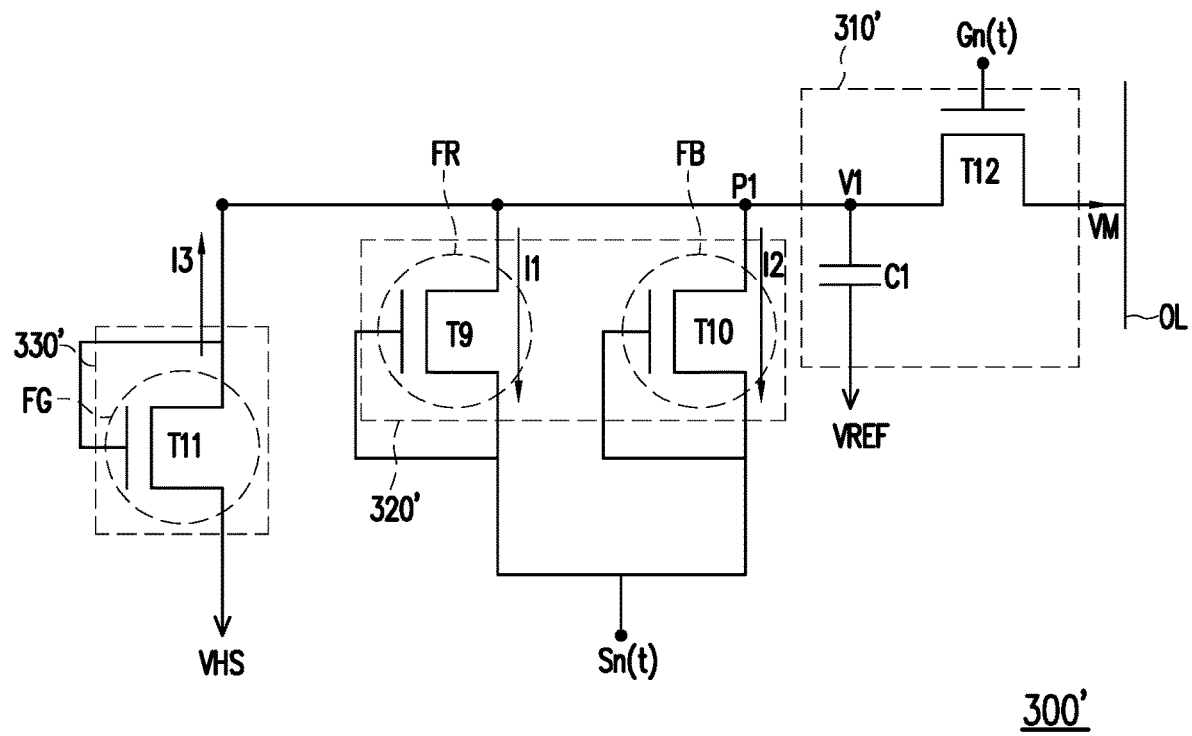
FIG. 5A is a circuit diagram of an optical sensor circuit operating under a discharging mode according to another embodiment of the disclosure.

FIG. 5A is a circuit diagram of the optical sensor circuit 300' operating under a discharging mode according to another embodiment of the disclosure. Referring to both FIG. 2A and FIG. 5A, the optical sensor circuit 300' of FIG. 5A is substantially identical or similar to the optical sensor circuit 300 of FIG. 2A, wherein the same or similar elements are denoted by the same or similar reference numerals. Different from the embodiment of FIG. 2A, the optical sensor circuit 300' of the present embodiment operates under a discharging mode.

When the optical sensor circuit 300' operates under the discharging mode, the optical sensor circuit 300' includes an output stage circuit 310', a sensor 320', and a sensor 330'. Specifically, the output stage circuit 310' includes a capacitor C1 and a transistor T12. The capacitor C1 is coupled between the node P1 and the reference voltage VREF. The first end of the transistor T12 is coupled to the node P1, the second end of the transistor T12 is coupled to the output line OL, and the control end of the transistor T12 receives the driving signal Gn(t).

The operation of the output stage circuit 310' under the discharging mode can be inferred with reference to the related description of the output stage circuit 310 mentioned in FIG. 2A, and therefore will not be described again.

The sensor 320' is coupled to the node P1. Specifically, the sensor 320' includes transistors T9 and T10. The first end and the control end of the transistor T9 commonly receive the driving signal Sn(t), and the second end of the transistor T9 is coupled to the node P1. The first end and the control end of the transistor T10 commonly receive the driving signal Sn(t), and the second end of the transistor T10 is coupled to the node P1. It should be noted that in this embodiment, the color filter FR may cover the transistor T9, and the color filter FB may cover the transistor T10.

The operation of the sensor 320' under the discharging mode and the properties of components can be inferred with reference to the related description of the sensor 320 mentioned in FIG. 2A, and therefore will not be described again.

On the other hand, the sensor 330' is coupled between the node P1 and the second system voltage VHS. Specifically, the sensor 330' includes a transistor T11. The first end of the transistor T11 is coupled to the second system voltage VHS, and the second end and the control end of the transistor T11 are commonly coupled to the node P1. Specifically, the voltage level of the second system voltage VHS may be, for example, a high voltage level. It is worth mentioning that in the embodiment, the color filter FG can cover the transistor T11.

The operation of the sensor 330' under the discharging mode and the properties of components can be inferred with reference to the related description of the sensor 330 mentioned in FIG. 2A, and therefore will not be described again.

Similar to the embodiment of FIG. 2A, the colors of the color filter FR, the color filter FG, and the color filter FB of the present embodiment may be red, green, and blue, respectively, but the present disclosure is not limited thereto. Moreover, the first color light of the embodiment may be, for example, red color light of ambient light; the second color light may be, for example, blue color light of ambient light; and the third color light may be, for example, green color light of ambient light, but the disclosure is not limited thereto.

Figure 5B:
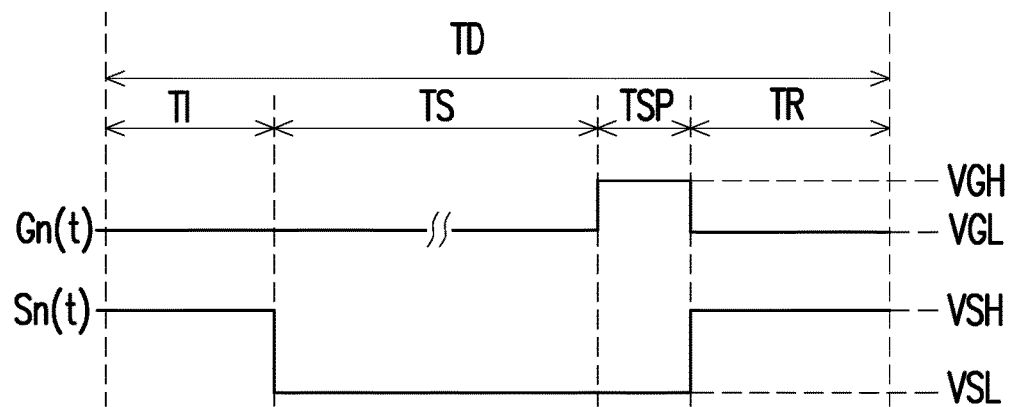
FIG. 5B is a schematic waveform diagram of an optical sensor circuit according to the embodiment in FIG. 5A.

FIG. 5B is a schematic waveform diagram of an optical sensor circuit 300' according to the embodiment in FIG. 5A. Regarding the operation details of the optical sensor circuit 300' under the discharging mode, please refer to FIG. 5A and FIG. 5B both. When the optical sensor circuit 300' operates in the initial stage TI, the output stage circuit 310' can receive the driving signal Gn(t) having the low voltage level VGL, and the sensor 320' can receive the driving signal Sn(t) having the high voltage level VSH. In this case, the optical sensor circuit 300' can perform an initialization operation on the first voltage V1 on the node P1.

Next, when the optical sensor circuit 300' operates in the sensing phase TS, the optical sensor circuit 300' can begin sensing different color lights from the environment. In the meantime, the output stage circuit 310' can receive the driving signal Gn(t) having the low voltage level VGL, and the sensor 320' can receive the driving signal Sn(t) having the low voltage level VSL.

In the present embodiment, when the optical sensor circuit 300' senses the white color light of the ambient light, since the spectrum of the white color light includes the bands of all color lights (for example, the red color light, the green color light, and the blue color light), the transistors T9 to T11 can respectively generate the photocurrents I1 to I3 based on these color lights.

In detail, in the embodiment, when the optical sensor circuit 300' senses the white color light of the ambient light, since the width of the transistor T11 is designed to be longer than the width of the transistors T9 and T10, in the transient time, the current value of the pull-up current (i.e., photocurrent I3) generated by the transistor T11 can be higher than the current value of the pull-down current (i.e., the photocurrent I1 and the photocurrent I2) generated by the transistor T9 and the transistor T10. In this manner, the first voltage V1 on the node P1 can be pulled up to the high voltage level VH according to the photocurrent I3 and the second system voltage VHS.

In the above case, when the optical sensor circuit 300' operates in the sampling phase TSP, the output stage circuit 310' can make the transistor T12 to be turned on according to the driving signal Gn(t) pulled up to the high voltage level VGH. Next, the output stage circuit 310' can transmit the first voltage V1 having the high voltage level VH to the output line OL.

On the other hand, when the optical sensor circuit 300' simultaneously senses the white color light and the blue color light (i.e., the second color light) of the ambient light, the transistor T10 can sense the additional blue color light to enhance the current value of the photocurrent I2. It should be noted that since the transistor T9 does not sense the additional red color light at this time, the photocurrent I1 is not sufficient to pull down the voltage level of the first voltage V1. Moreover, in the present embodiment, the width of the transistor T11 can be designed to be longer than the transistor T9 and the transistor T10. Therefore, in the transient time, the current value of the pull-up current (i.e., the photocurrent I3) generated by the sensor 330' can still be higher than the current value of the pull-down current (i.e., the photocurrent I1 and the photocurrent I2) generated by the sensor 320. In this case, the first voltage V1 on the node P1 can be pulled up to the high voltage level VH according to the photocurrent I3 and the second system voltage VHS.

In the above case, when the optical sensor circuit 300' operates in the sampling phase TSP, the output stage circuit 310 can transmit the first voltage V1 having the high voltage level VH to the output line OL.

On the other hand, when the optical sensor circuit 300' simultaneously senses the white color light and the red color light (i.e., the first color light) of the ambient light, the transistor T9 can sense the additional red color light to enhance the current value of the photocurrent I1. It should be noted that since the transistor T10 does not sense the additional blue color light at this time, the photocurrent I2 is not sufficient to pull down the voltage level of the first voltage V1. Moreover, in the present embodiment, the width of the transistor T11 can be designed to be longer than the transistor T9 and the transistor T10. Therefore, in the transient time, the current value of the pull-up current (i.e., the photocurrent I3) generated by the sensor 330' can still be higher than the current value of the pull-down current (i.e., the photocurrent I1 and the photocurrent I2) generated by the sensor 320'. In this case, the first voltage V1 on the node P1 can be pulled up to the high voltage level VH according to the photocurrent I3 and the second system voltage VHS.

In the above case, when the optical sensor circuit 300' operates in the sampling phase TSP, the output stage circuit 310 can also transmit the first voltage V1 having the high voltage level VH to the output line OL.

On the other hand, when the optical sensor circuit 300' simultaneously senses the white color light, the red color light (i.e., the first color light), and the blue color light (i.e., the second color light) of the ambient light, the transistor T9 can sense the additional red color light to enhance the current value of the photocurrent I1. Moreover, the transistor T10 can sense the additional blue color light to enhance the current value of the photocurrent I2. In this case, in the transient time, the current value of the pull-down current (i.e., the photocurrent I1 and the photocurrent I2) generated by the sensor 320' may be higher than the current value of the pull-up current (i.e., photocurrent I3) generated by the sensor 330'. In other words, the first voltage V1 on the node P1 can be pulled down to the low voltage level VL according to the photocurrent the photocurrent I2, and the driving signal Sn(t).

In the above case, when the optical sensor circuit 300' operates in the sampling phase TSP, the output stage circuit 310' can transmit the first voltage V1 having the low voltage level VL to the output line OL.

Specifically, when the optical sensor circuit 300' operates in the reset phase TR, the output stage circuit 310' can receive the driving signal Gn(t) having the low voltage level VGL, and the sensor 320' can receive the driving signal Sn(t) having the high voltage level VSH. In this case, the optical sensor circuit 300' can perform a reset operation on the first voltage V1 on the node P1.

According to the above description of the embodiment of FIG. 5A, it can be obtained that in the sensing phase TS under the discharging mode, when the sensor 320' simultaneously senses the additional red color light (i.e., first color light) and the blue color light (i.e., the second color light), the sensor 320' can adjust (e.g., pull down) the voltage level of the first voltage V1 according to the photocurrent I1, the photocurrent I2, and the driving signal Sn(t). In contrast, when the sensor 320' does not simultaneously sense the additional red color light (i.e., first color light) and the blue color light (i.e., second color light), the sensor 330' may adjust (e.g., pull up) the voltage level of the first voltage V1 according to the photocurrent I3 and the second system voltage VHS.

In other words, in the embodiment of the present disclosure, in the case where the optical sensor circuit 300' operates under the discharging mode, when the sensor 320' simultaneously senses the additional red color light (i.e., first color light) and the blue color light (i.e., the second color light), the first voltage V1 on the node P1 can be maintained at the state of low voltage level without being influenced by the white color light of the ambient light and pulled up to a high voltage level, thereby ensuring that the optical sensor circuit 300' can be operated normally in the sensing phase TS under the discharging mode.

Figure 6A:
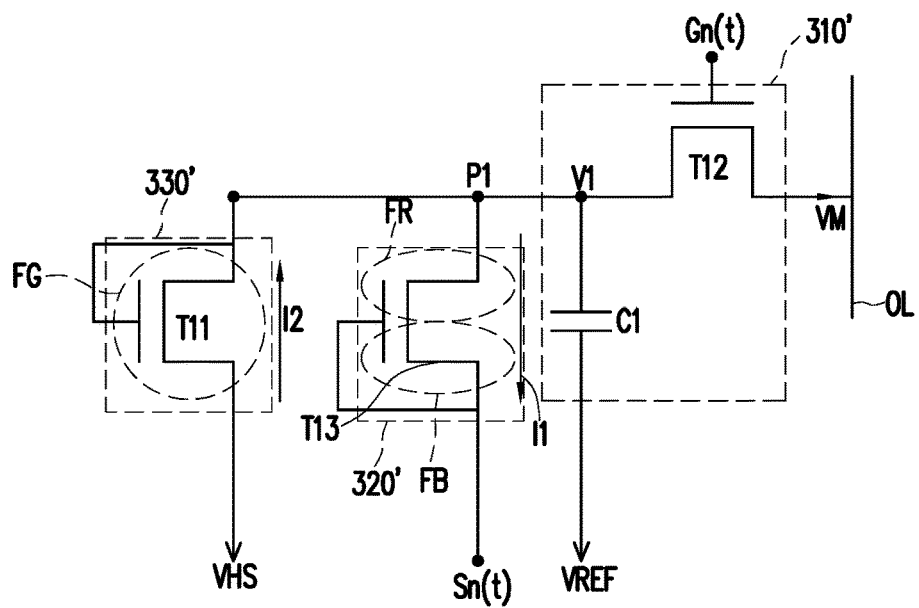
FIG. 6A is a circuit diagram of an optical sensor circuit operating under a discharging mode according to yet another embodiment of the disclosure.

FIG. 6A is a circuit diagram of an optical sensor circuit 500' operating under a discharging mode according to yet another embodiment of the disclosure. Referring to both FIG. 3A and FIG. 6A, the optical sensor circuit 500' of FIG. 6A is substantially identical or similar to the optical sensor circuit 500 of FIG. 3A, wherein the same or similar elements are denoted by the same or similar reference numerals. Different from the embodiment of FIG. 3A, the optical sensor circuit 500' operates in a discharging mode.

When the optical sensor circuit 500' operates under the discharging mode, the optical sensor circuit 500' can include an output stage circuit 310', a sensor 320', and a sensor 330'. The output stage circuit 310' includes a capacitor C1 and a transistor T12. The capacitor C1 is coupled between the node P1 and the reference voltage VREF. The first end of the transistor T12 is coupled to the node P1, the second end of the transistor T12 is coupled to the output line OL, and the control end of the transistor T12 receives the driving signal Gn(t).

The sensor 320' is coupled to the node P1. Specifically, the sensor 320' includes a transistor T13. The first end and the control end of the transistor T13 commonly receive the driving signal Sn(t), and the second end of the transistor T13 is coupled to the node P1. The sensor 330' is coupled between the node P1 and the second system voltage VHS. Specifically, the sensor 330' includes a transistor T11. The first end of the transistor T11 is coupled to the second system voltage VHS, and the second end and the control end of the transistor T11 are commonly coupled to the node P1. Specifically, the voltage level of the second system voltage VHS may be, for example, a high voltage level.

It is to be noted that, in this embodiment, the color filter FR may cover the second portion of the transistor T13, and the color filter FB may cover the first portion of the transistor T13. Specifically, the first portion and the second portion do not completely overlap each other.

Figure 6B:
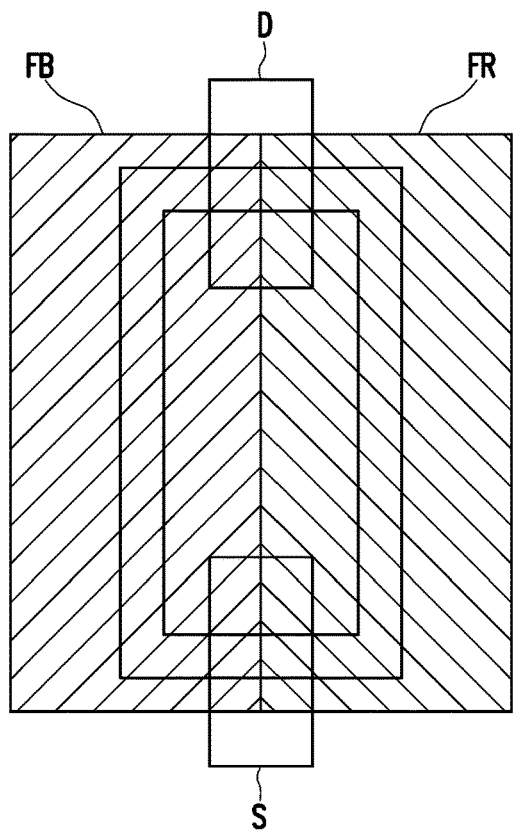
FIG. 6B and FIG. 6C are top views of the first transistor according to the embodiment in FIG. 6A.
Figure 6C:
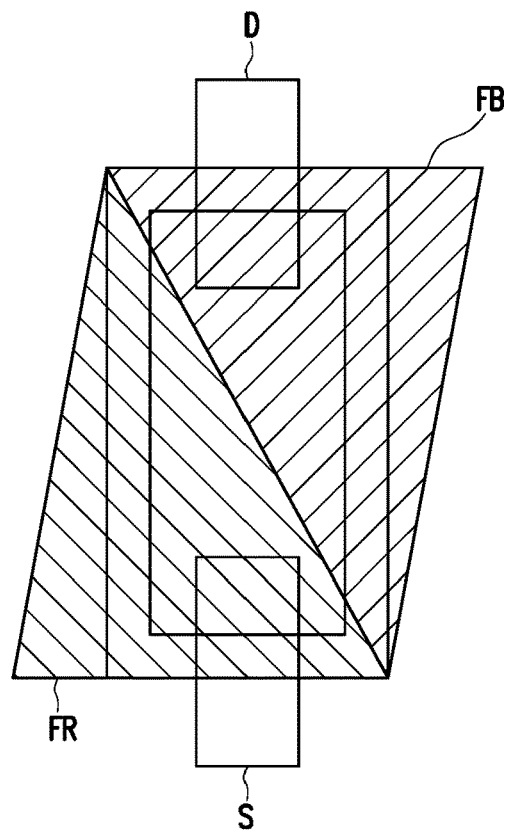

FIG. 6B and FIG. 6C are top views of the first transistor T13 according to the embodiment in FIG. 6A. Please refer to FIG. 6A to FIG. 6C both. Specifically, when the optical sensor circuit 500' operates under the discharging mode, the red color filter FR may cover a portion (for example, the portion oblique to the right in FIG. 6B and FIG. 6C) of the transmission path formed by the source terminal S and the drain terminal D of the transistor T13 in any shape (for example, rectangular or triangular, but the disclosure is not limited thereto) through the means of resist coating method. Moreover, the blue color filter FB may cover another portion (for example, the portion oblique to the right in FIG. 6B and FIG. 6C) of the transmission path formed by the source terminal S and the drain terminal D of the transistor T13.

Specifically, in this embodiment, the optical sensor circuit 500' can utilize the second portion of the transistor T13 (for example, the portion oblique to the right in FIG. 6B and FIG. 6C) to sense the red color (i.e., the first color light) of the ambient light, and utilize the first portion of the transistor T13 (for example, the portion oblique to the left in FIG. 6B and FIG. 6C) to sense the blue color light (i.e., the second color light) of the ambient light. Specifically, the width of the transistor T11 can be designed to be longer than the width of the transistor T13. In other words, when the sensor 320' simultaneously senses the additional red color light (i.e., first color light) and the blue color light (i.e., the second color light), since the current value of the pull-down current (i.e., photocurrent I1) of the sensor 320' at this time is higher than the current value of the pull-up current (i.e., the photocurrent I2) of the sensor 330', the sensor 320' can pull down the first voltage V1 on the node P1 to the low voltage level according to the pull-down current (i.e., the photocurrent I1) and the driving signal Sn(t). In this manner, the first voltage V1 can be pulled up to a high voltage level without being affected by the white color light of the ambient light, thereby ensuring that the optical sensor circuit 500' can be normally operated in the sensing phase TS under the discharging mode.

Figure 7:
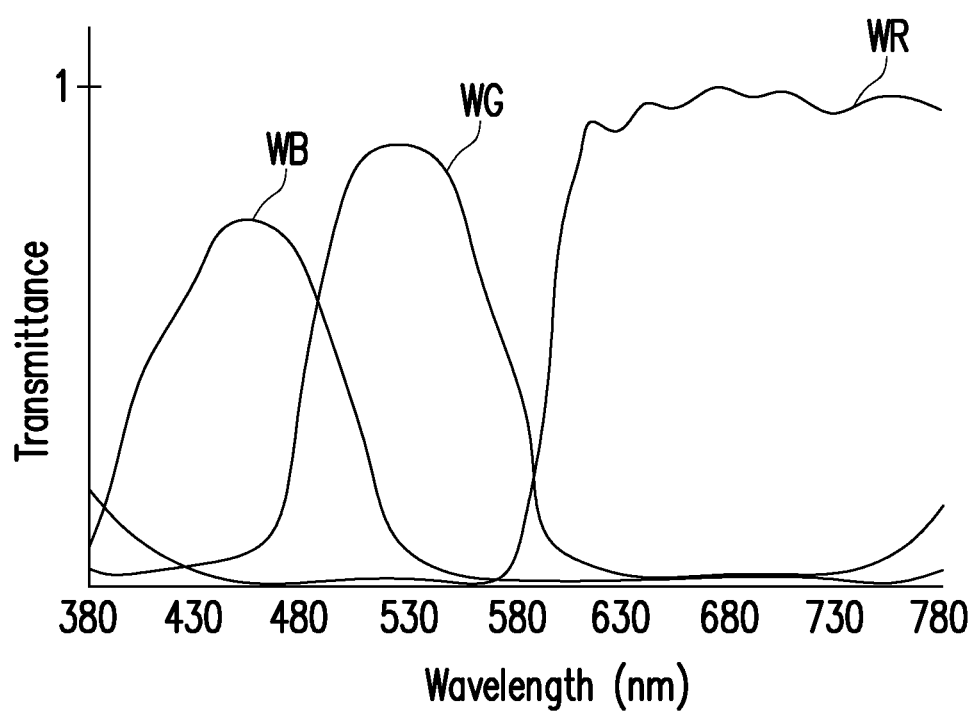
FIG. 7 is a schematic diagram of pass wavelengths of various color filters according to an embodiment of the disclosure.

FIG. 7 is a schematic diagram of pass wavelengths of various color filters FR, FG and FB according to an embodiment of the disclosure. In the schematic diagram shown in FIG. 7, the horizontal axis represents the pass wavelength of ambient light, and the vertical axis represents the transmittance of each color filter. Specifically, the color filter FR, the color filter FG, and the color filter FB mentioned in FIG. 1A to FIG. 6C described above respectively have a plurality of different pass wavelengths. For example, in the pass wavelength range covered by the waveform WR, the color filter FR may pass through the red color light of the ambient light in the pass wavelength range; in the pass wavelength range covered by the waveform WG, the color filter FG can pass through the green color light of the ambient light in the pass wavelength range; in the pass wavelength range covered by the waveform WB, the color filter FB may pass through the blue color light of the ambient light in the pass wavelength range.

In summary, the optical sensor circuit of the disclosure can adjust the voltage level on the capacitor in the output stage circuit according to the driving signal and the pull-up or pull-down current in the sensor when operating under the charging mode and the discharging mode while the sensor senses the additional red color light and the blue color light simultaneously. In this manner, under the charging mode, the voltage level of the voltage on the capacitor can be maintained at the state of high voltage level without being influenced by the white color light of the ambient light and pulled down to a low voltage level. Moreover, under the discharging mode, the voltage level of the voltage on the capacitor can be maintained at the state of low voltage level without being influenced by the white color light of the ambient light and pulled up to a high voltage level, thereby ensuring that the optical sensor circuit can be operated normally during the sensing phase under the charging mode and the discharging mode.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical sensor circuit, comprising:
   an output stage circuit, having a first node and a second node, the output stage circuit transmitting a first voltage of the first node and a second voltage of the second node to an output line according to a first driving signal;
   a first sensor, coupled to the first node, the first sensor configured to generate a first photocurrent according to a first color light sensing an ambient light, and to generate a second photocurrent according to a second color light sensing the ambient light; and
   a second sensor, coupled to the second node, the second sensor configured to generate a third photocurrent according to a third color light sensing the ambient light, and to generate a fourth photocurrent according to the second color light sensing the ambient light,
   wherein in a sensing phase, when the first sensor senses the first color light, and the second sensor senses the third color light, the first sensor adjusts a voltage level of the first voltage according to the first photocurrent, and the second sensor adjusts a voltage level of the second voltage according to the third photocurrent,
   wherein the first sensor comprises:
      a first color filter and a second color filter;
      a first transistor, a first end of the first transistor coupled to a third node, a second end and a control end of the first transistor commonly coupled to the first node, wherein the first color filter covers the first transistor;
      a second transistor, a first end of the second transistor receiving a second driving signal, a second end and a control end of the second transistor commonly coupled to the third node, wherein the first color filter covers the second transistor; and
      a third transistor, a first end and a control end of the third transistor commonly coupled to a first system voltage, and a second end of the third transistor coupled to the third node, wherein the second color filter covers the third transistor,
   wherein the second sensor comprises:
      the second color filter and a third color filter;
      a fourth transistor, a first end of the fourth transistor coupled to a fourth node, a second end and a control end of the fourth transistor commonly coupled to the second node, wherein the third color filter covers the fourth transistor;
      a fifth transistor, a first end of the fifth transistor receiving the second driving signal, a second end and a control end of the fifth transistor commonly coupled to the fourth node, wherein the third color filter covers the fifth transistor; and
      a sixth transistor, a first end and a control end of the sixth transistor commonly coupled to the first system voltage, and a second end of the sixth transistor coupled to the fourth node, wherein the second color filter covers the sixth transistor,
   wherein the first color filter, the second color filter, and the third color filter respectively have a plurality of different pass wavelengths.

2. The optical sensor circuit according to claim 1, wherein the colors of the first color filter, the second color filter, and the third color filter are red, green, and blue, respectively.

3. The optical sensor circuit according to claim 1, wherein a width of the third transistor is longer than widths of the first transistor and the second transistor, and a width of the sixth transistor is longer than widths of the fourth transistor and the fifth transistor.

4. The optical sensor circuit according to claim 1, wherein the output stage circuit comprises:
   a first capacitor, coupled between the first node and a reference voltage;
   a seventh transistor, a first end of the seventh transistor coupled to the first node, a second end of the seventh transistor coupled to the output line, and a control end of the seventh transistor receiving the first driving signal;
   a second capacitor, coupled between the second node and the reference voltage; and
   a eighth transistor, a first end of the eighth transistor coupled to the second node, a second end of the eighth transistor coupled to the first node, and a control end of the eighth transistor receiving the first driving signal.

5. The optical sensor circuit according to claim 1, wherein the wavelengths of the first color light, the second color light, and the third color light are different from each other.

* * * * *